Figure 1:
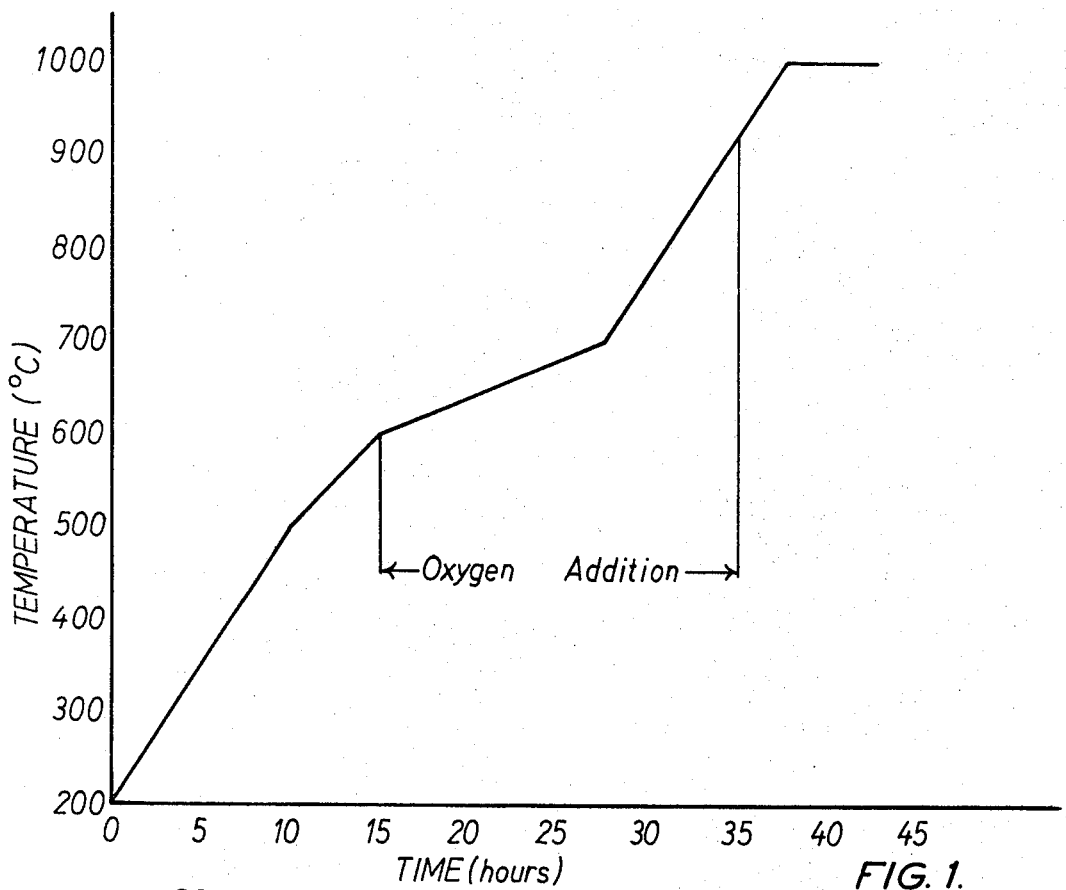

United States Patent [19]

Procter

[11] 4,340,555

[45] Jul. 20, 1982

[54] MANUFACTURE OF CERAMIC ARTICLES

[76] Inventor: James W. Procter, 12 Victoria St., Southport, PR9 ODU, Merseyside, England

[21] Appl. No.: 131,572

[22] Filed: Mar. 19, 1980

Related U.S. Application Data

[63] Continuation of Ser. No. 857,968, Dec. 6, 1977, abandoned.

[30] Foreign Application Priority Data

Dec. 8, 1976 [GB] United Kingdom ............... 51102/76

[51] Int. Cl.$^3$ ............................................. C04B 33/32
[52] U.S. Cl. ........................................ 264/65; 264/66
[58] Field of Search ....................... 264/44, 59, 64, 65, 264/66

[56] References Cited

U.S. PATENT DOCUMENTS 2,567,556  9/1951  Dressler ............................... 264/64

FOREIGN PATENT DOCUMENTS 1422689  1/1976  United Kingdom .

Primary Examiner—John A. Parrish
Attorney, Agent, or Firm—Beveridge, DeGrandi & Kline

[57] ABSTRACT

The present invention relates to a process for the manufacture of ceramic articles from carbonaceous clay comprising heat-treating shaped articles of carbonaceous clay in a kiln, in which process, oxygen is added to the kiln separately from the fuel to increase the oxygen level of the kiln during oxidation of the carbon content of the clay.

13 Claims, 5 Drawing Figures

MANUFACTURE OF CERAMIC ARTICLES

This is a continuation of application Ser. No. 857,968 filed Dec. 6, 1977, now abandoned.

The present invention relates to the manufacture of ceramic products, such as bricks. For the sake of convenience, the ceramic products of this invention will be referred to hereinafter as "bricks".

Bricks are manufactured from clays of different compositions depending upon their origin. Clays from areas such as Lancashire, Scotland, Yorkshire, West Midlands and London have an average carbon content of about 2.5% by weight.

Bricks are formed by a firing process which forms the constituent of the clay into a homogeneous mass. Of all the constituents of carbonaceous clays carbon is the most easily oxidized so that it takes up oxygen from the air in the kiln thus preventing the oxidation of the other constituents until all the carbon has been burnt out. Therefore, the presence of carbon in clays is disadvantageous, since a long period of time is needed to burn out carbon from the clay during the brick production.

Hitherto carbon has been removed from clay bricks by maintaining the bricks at a temperature of from 600° to 900° C. so that the carbon is oxidized by oxygen passing over the bricks. However, the amount of oxygen in the kiln atmosphere may be as low as 2% by volume.

Carbon is only slowly removed and consequently, with a low oxygen concentration in the kiln atmosphere, in order totally to remove the carbon, a large volume of air is required.

Furthermore, the cost of fuel is ever increasing and, therefore, ways of reducing the amount of fuel used are being sought. A reduction in the amount of fuel used would result from a reduction in firing cycle time. However, most kilns are now operated so efficiently that no further reduction in firing cycle time can readily be achieved.

The firing cycle time is limited by the speed at which oxidation of the brick material takes place. The speed of oxidation will depend on the amount of oxygen present in the kiln atmosphere.

The oxygen content of a kiln will vary from time to time and/or from zone to zone depending on the type of kiln and the reaction taking place. An average oxygen content of about 15% is usually present but this can be as low as 2% during the carbon burn-out period.

It is known from British Patent Specification No. 1422689 to supply oxygen-rich gas to a kiln in which ceramic or clay products are being heat-treated. However, the oxygen-rich gas is supplied in order to support combustion of the fuel so that a rapid rate of increase of temperature in the kiln can be achieved when required.

However, because the burners are efficient and the fuel supply is selected to ensure that all the oxygen supplied is burnt, there is a tendency to starve the kiln atmosphere of oxygen, so that the amount of oxygen available for oxidising carbon from the clay will be reduced. Also, the burner flames may be more concentrated, although giving more heat, and cause localised hot spots. Therefore the process of British Patent Specification No. 1422689 is not suitable for carbon burn out from carbonaceous clay.

It has now been found that the introduction of oxygen into the kiln to supplement the oxygen content therein during the carbon burn-out period can reduce the period.

According to the present invention there is provided a process for the manufacture of ceramic products from carbonaceous clay comprising heat-treating shaped articles of carbonaceous clay in a kiln, in which process, oxygen is added to the kiln separately from the fuel to increase the oxygen level of the kiln during oxidation of the carbon content of the clay.

In a shuttle kiln, the burners are operated continuously during the heat treatment of the clay bricks. The oxygen may be introduced to the shuttle kiln at points around the burner ports but it is preferred that the points of introduction of the oxygen be at least two inches from burner flames.

Tunnel kilns generally comprise a pre-heat zone, a burner zone and a cooling zone. The oxygen may be introduced into the kiln via lances positioned in the pre-heat zone preferably at least one meter before the first burners in the burner zone.

The lances will determine the velocity with which the additional oxygen enters the kiln. The velocity which will ensure that the oxygen penetrates the brick stacks, must be determined by experimentation. The smaller the nozzle of the lance the higher the velocity of the oxygen will be.

Carbon will react with oxygen at temperature from about 600° C. upwards. Therefore, the oxygen may be introduced to a shuttle kiln once the kiln temperature has reached about 600° C. Substantially, all of the carbon in the clay will have been burnt out by the time the kiln has reached about 925° C. whereupon oxygen introduction is ceased.

In a tunnel kiln, the clay bricks are gradually heated up by the hot gases produced in the burner zone as they travel along the kiln. The oxygen is therefore added at a point or points in the kiln where the kiln temperature is at least 600° C. The burner zone will usually be at a temperature of about 1000° C. and no additional oxygen is added to the burner zone other than that in the air used in the fuel combustion.

The oxygen content of a kiln depends on several factors including the amount of fuel being used, the constituents of the clay being heat-treated and the rate at which air is passed through the kiln.

In the case of a shuttle kiln the oxygen content may be on average 8% by volume and can fall as low as 2% by volume during the carbon burn out period.

Oxygen is introduced to the kiln during the carbon burn out period to raise the oxygen content level preferably to 14 to 18% by volume especially 16% by volume.

The oxygen level in a tunnel kiln will vary depending on the zone. Carbon is generally burnt out of the clay in the zone just prior to the burner zone. The oxygen content in this zone may be as low as 6% by volume depending on the carbon content of the clay. It is preferred to introduce oxygen to raise this to 14 to 18% by volume especially to about 15% by volume.

Obviously the higher the carbon content of the clay being used, the more oxygen will be required during the carbon burn out period or in the carbon burn out zone, depending on the type of kiln.

The rate at which oxygen is introduced to the kiln depends on factors such as the composition of the material from which the bricks are being made and the oxygen level which is desired. However, it is preferable to introduce the oxygen to a shuttle kiln at a rate of from 1500 to 2000 cu.ft/hour. For a tunnel kiln the rate may be from 800 to 2000, preferably 1000, cu.ft/hour.

The introduction of oxygen to a kiln according to the process of the invention can have a twofold effect. Firstly, carbon may be removed from the clay rapidly and secondly, the heat from the exothermic reaction of carbon with oxygen is generated over a shorter period of time and therefore assists in raising the temperature of the kiln, thus less fuel is required to do this.

Figure 2:
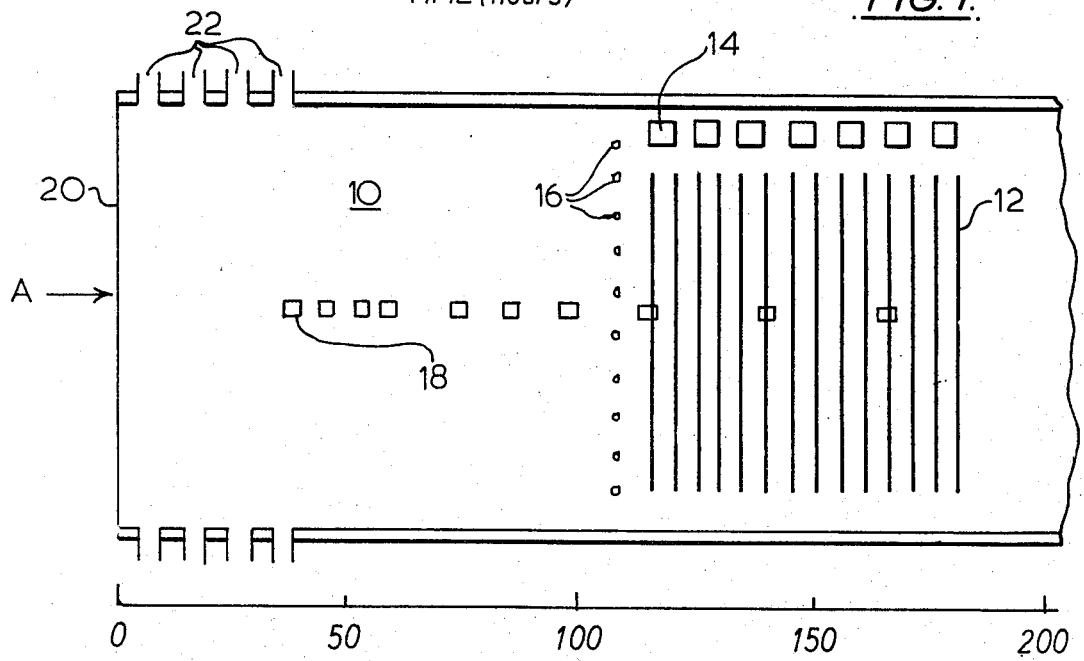
Figure 1A:
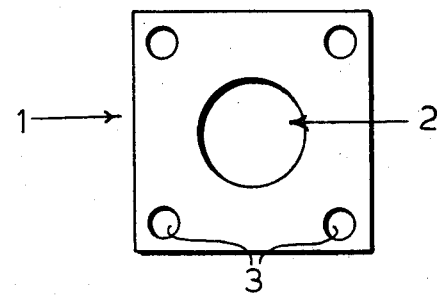
Figure 4:
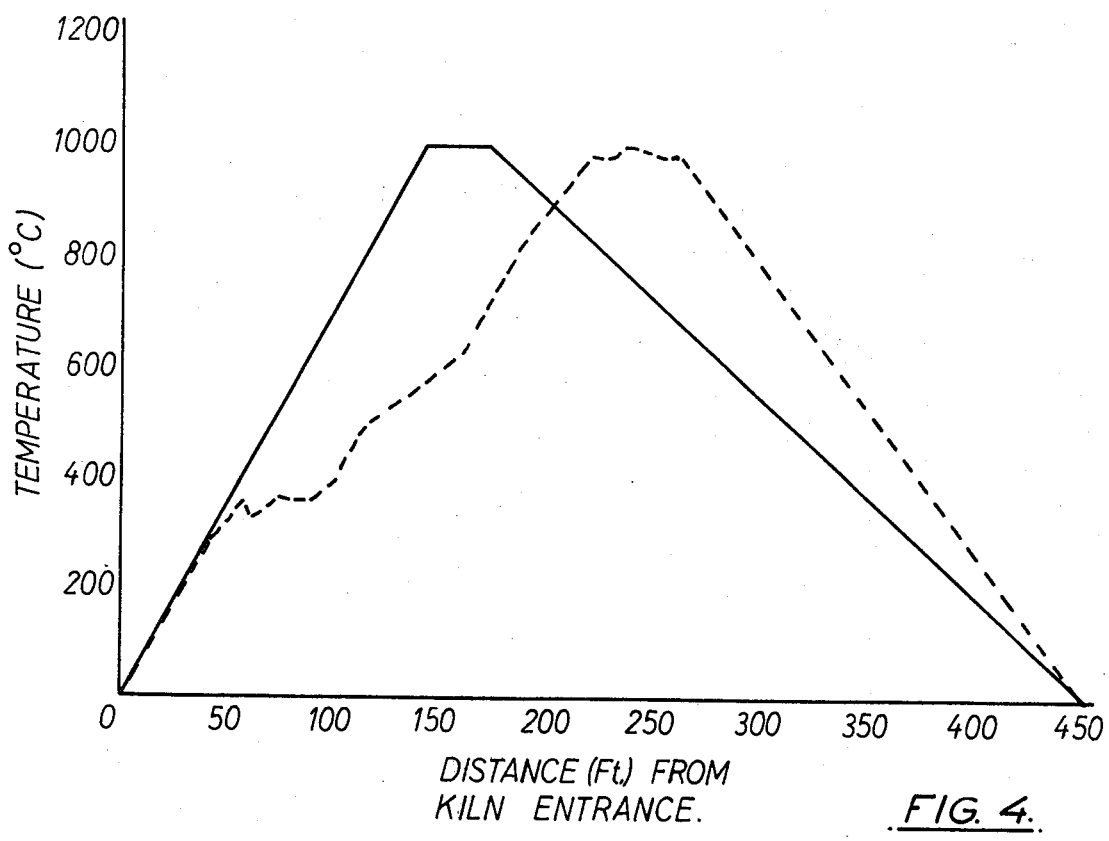
Figure 3:
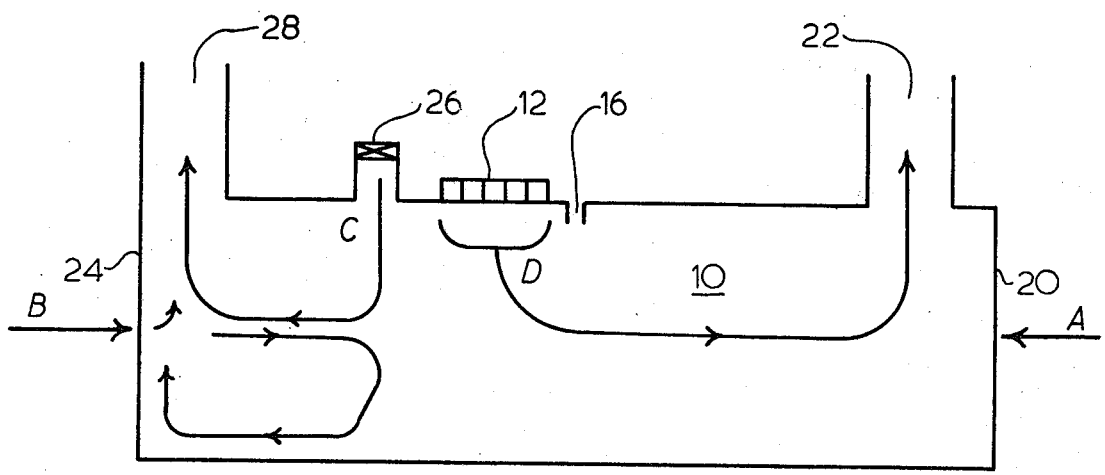

The present invention will now be further described with reference to the accompanying drawings in which:

FIG. 1. is a graph showing a typical temperature/time relationship during the firing of clay to form bricks in a shuttle kiln FIG. 1a. shows a typical burner port arrangement used in a shuttle kiln;

FIG. 2. is a schematic plan view of a tunnel kiln showing the positioning of the oxygen inlets and the burner groups;

FIG. 3. is a schematic sectional view of the tunnel kiln of FIG. 2. showing the air currents in the kiln; and FIG. 4. is a graph showing a typical temperature/distance from kiln entrance relationship during the production of bricks in the tunnel kiln of FIGS. 2 and 3.

Referring to FIG. 1, clay bricks are introduced to a shuttle kiln at about 200° C. The clay bricks are produced by grinding clay into fine particles, preferably having a maximum diameter of about ⅛". Water is mixed in with the clay and the mixture extruded. The extruded clay is cut into bricks by means of a wire cutter. The bricks are then dried at 200° C. and introduced to the kiln.

The kiln is heated by means of burners using butane gas as fuel. Other fuels such as natural gas, oil, coal, etc., may be used. As can be seen from the graph the kiln is heated to a temperature of about 600° C. over a period of 15 hours after which, oxygen is introduced to the kiln over a period of about 20 hours. The oxygen is introduced to the kiln via the burner ports at a point spaced from the flame. The heat turbulence will ensure that the oxygen is circulated throughout the kiln. In the particular kiln to which the graph refers the oxygen was injected at 27 burner ports (FIG. 1a) via four ducts 3 situated about 2" from the gas and combustion duct 2 of each port 1.

During this time the temperature of the kiln is raised to about 925° C. and the carbon content of the clay is being burnt out. Finally, the bricks are maintained at a temperature of about 1000° C. for 5 hours to ensure that each brick has the same heat treatment throughout. This final heat treatment may be carried out at a higher temperature over a shorter period of time or at a lower temperature over a longer period of time. However, the criterion for this final heat treatment is that each brick receives the same heat treatment throughout. The fired bricks are allowed to cool over a period of about 24 hours.

The overall firing time was about 43 hours which is less than half of conventional firing times.

Referring to FIG. 2, the tunnel kiln 10 has fourteen rows 12 of burners. Each row 12 has ten burner ports. Each pair of burner port rows 12 has a fan 14 which blows air into the kiln 10 at a rate of about 565 cu.ft./min. The fuel used by the burners is butane gas. At a point before the first row of burners, is a row of ten lances 16 through which oxygen is introduced to the kiln. At several points along the kiln are thermocouples 18 for measuring the temperature of the kiln 10.

The air flows within the kiln 10 are shown in FIG. 3. The clay bricks are introduced through the kiln entrance 20 in the direction of arrow A, at rates such as about one car every 30 to 55 minutes. Air flows from the burners 12 in the direction of arrow D towards the entrance of the kiln 20 and out through the exhaust duct 22, thus heating the clay bricks gradually as they pass through the kiln. The clay bricks reach a maximum temperature in the region of the burners 12. Once the bricks have passed the burners 12, they are cooled by air traveling in the direction of arrow B from the kiln exit 24 and by air travelling in the direction of arrow C which is introduced by a fan 26. This cooling air escapes through outlet 28.

FIG. 4 shows the temperature/distance from kiln entrance ratio for a conventional brick manufacturing process in tunnel kiln (dotted line) and for the process of the present invention (continuous line). In the latter process, oxygen was introduced to the kiln so that the oxygen level was raised to about 18% by volume in the zone of the kiln where the oxidation of carbon was taking place.

It can be seen from the graphs that the introduction of oxygen enables the bricks to be heated up more rapidly i.e. the pre heat zone is shorter than in a conventional process. Therefore, the bricks reach the firing zone sooner.

As shown in the graphs, the bricks manufactured according to the process of the present invention were allowed to cool down to ambient temperature over the remaining length of the kiln.

If a new kiln is built to operate according to the process of this invention, it need not be as long as if it were to operate according to conventional processes since the preheat zone can be reduced in length. The result is construction cost savings. For an existing kiln the speed at which the bricks are passed through the kiln may be increased, thus increasing the rate of production.

In this case, the full length of the kiln would be used with the burner zone in the same position as in the conventional process.

This process of the present invention enables bricks of high quality to be produced, i.e. the bricks are fired to the core. Also, the process of the present invention enables fuel saving, since less fuel is used in burning out carbon from the clay and less fuel is used to heat up the clay bricks due to the faster generation of exothermic heat arising from reaction between carbon and oxygen.

The present invention will now be further described by means of the following Examples:

EXAMPLE 1

Firstly clay is ground into fine particles, preferably having a maximum diameter of about ⅛". Water is mixed in with the clay and the mixture extruded. The extruded clay is cut into bricks by means of wire. The bricks are then dried at 100° C.

The dried bricks are passed to a shuttle kiln for firing. The kiln is heated by means of burners, using butane as fuel. The kiln is heated to a temperature of about 600° C. over a period of 15 hours after which, oxygen (80-100% pure) is introduced to the kiln at the rate of about 1500 cu.ft./hour over a period of about 24 hours.

The oxygen was injected at 27 burner ports and in each case at a distance of about 2" from the flame. During this time the temperature of the kiln is raised to about 925° C. and the carbon content of the clay is being burnt out. Finally, the bricks are maintained at a temperature of about 1000° C. for 5 hours to ensure that each brick has the same heat treatment throughout. The fired bricks are allowed to cool over a period of about 24 hours.

The overall firing time was about 43 hours using about 5.5 tons of butane which is less than half of conventional firing times during which time about 7 tons of butane would have been used.

EXAMPLE 2

Clay is ground into fine particles having a maximum diameter ⅛" water is mixed with the clay and the mixture is extruded. The extruded clay is cut into bricks by means of a cutter. The bricks are then dried at temperatures up to 100° C.

The dried bricks are loaded onto kiln cars which are fed into a tunnel kiln (i.e. a continuous kiln). The kiln is heated at various points by means of butane fuel injected through burner lances set in groups. In the preheat zone the bricks are only heated to a temperature of about 850° C. Oxygen is introduced into the preheat zone at 50 meters from the kiln entrance, i.e. at a point were the kiln temperature is from 800° C.–850° C.

The oxygen is fed into the kiln through ten lances spread across the width of the kiln and is introduced at a rate of 1000 cu ft per hour at a pressure which varied from 100 psi to 140 psi.

The oxygen enriched air in the pre heat zone enables the carbon to be burnt out of the bricks in a shorter period of time compared with a normal firing cycle.

Therefore, compared with a normal firing cycle the whole of the firing zone is advanced two meters down the kiln (i.e. towards the kiln entrance) and the draught is reduced by 20%. This draught is used to feed air through the firing zone for combustion purposes and thereby to transmit heat to the preheat zone.

The overall effect of the movement of the firing zone in the kiln and the introduction of oxygen is to reduce the firing cycle of bricks. The preheat zone maintains an adequate temperature with a reduced draught and therefore the cooling effect of the draught on the firing zone is similarly reduced. A resultant saving of fuel of in excess of 10% is achieved.

It will be appreciated that, although the process of the present invention has been described with reference to the manufacture of bricks, other ceramic products may be produced by this process from carbonaceous clays.

I claim:

1. In the process for the manufacture of ceramic products from carbonaceous clay comprising heat-treating shaped articles of carbonaceous clay in a kiln wherein carbon is removed by oxidation, the improvement comprising adding essentially pure oxygen to the kiln separately from the fuel to increase the oxygen level in the kiln during oxidation of the carbon content of the clay.

2. A process as claimed in claim 1 in which the additional oxygen is introduced to the kiln at a point or points spaced from the burner ports.

3. A process as claimed in claim 2 in which the additional oxygen is introduced when the kiln is at a temperature of at least 600° C.

4. A process for the manufacture of ceramic products from carbonaceous clay in a shuttle kiln comprising heat-treating shaped articles of carbonaceous clay in said kiln, wherein essentially pure oxygen is added to the kiln spearately from the fuel to increase the oxygen level in the kiln during oxidation of the carbon content of the clay, the oxygen being introduced at least two inches from burner flames.

5. A process as claimed in claim 4 in which the oxygen level of the kiln during oxidation of the carbon content of the clay is raised to 14 to 18% by volume.

6. A process as claimed in claim 5 in which the oxygen level of the kiln is raised to 16% by volume.

7. A process as claimed in claim 5 in which the additional oxygen is introduced to the kiln at a rate of from 1500 to 2000 cu.ft./hour.

8. A process for the manufacture of ceramic products from carbonaceous clay in a tunnel kiln including a preheat zone, a burner zone and a cooling zone, comprising heat-treating shaped articles of carbonaceous clay in said kiln, wherein essentially pure oxygen is added to the kiln separately from the fuel to increase the oxygen level in the kiln during oxidation of the carbon content of the clay, the oxygen being introduced to the kiln at least one meter from the first burners in the burner zone.

9. A process as claimed in claim 8 in which the oxygen level of the kiln is raised to 14 to 18% by volume in the zone prior to the burner zone.

10. A process as claimed in claim 8 in which the oxygen level of the kiln is raised to 15% by volume.

11. A process as claimed in claim 9 in which the additional oxygen is introduced to the kiln at a rate of from 800 to 2000 cu.ft./hour.

12. A process as claimed in claim 11 in which the oxygen introduction rate is 1000 cu.ft./hour.

13. A process according to any one of claims 1 to 12 in which the added oxygen is 80–100% pure.

* * * * *